Nov. 28, 1933.                J. R. SMITH                1,937,416
               PROCESS OF ROASTING PIMIENTO PEPPERS AND THE LIKE
                              Filed Oct. 3, 1929
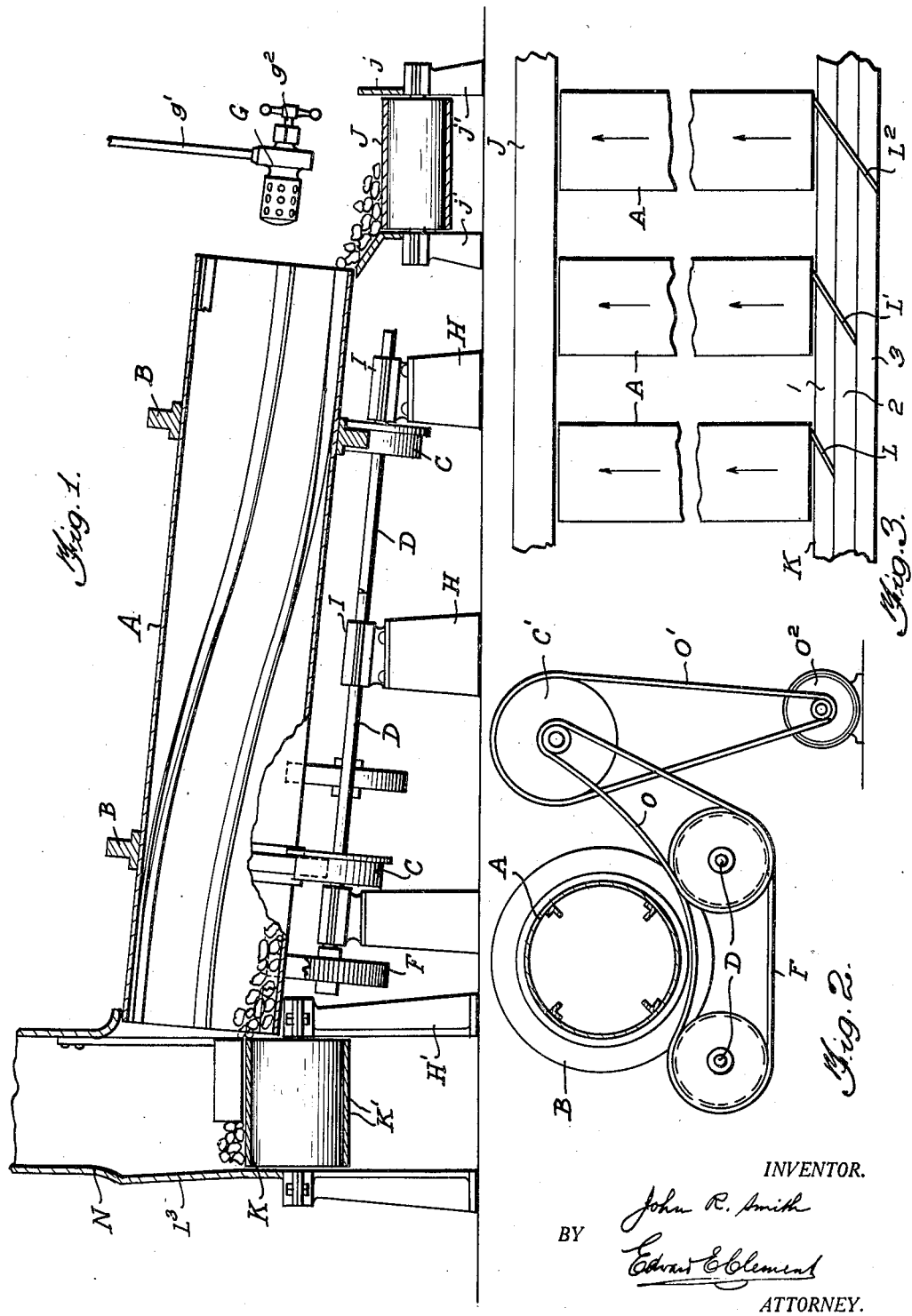
INVENTOR.
John R. Smith
BY Edward E. Clement
ATTORNEY.

Patented Nov. 28, 1933

1,937,416

UNITED STATES PATENT OFFICE 1,937,416

PROCESS OF ROASTING PIMIENTO PEPPERS AND THE LIKE

John R. Smith, McDonough, Ga., assignor to Pomona Products Company, Spaulding County, Ga., a corporation Application October 3, 1929. Serial No. 397,094

2 Claims. (Cl. 126—41)

My invention relates to roasting food materials, and particularly to the roasting of pimiento peppers, chilies, and the like. An object of my invention is to produce a method and means of greater efficiency and economy both in construction and operation and capable of mass production than those heretofore employed, which will consume less fuel and be practically automatic in operation and produce uniform results in the food products.

I attain my objects in the manner to be hereinafter specifically described. Broadly stated, the machine includes a roasting drum or cylinder mounted on an incline and supported on rollers which by means of a suitable drive maintain constant rotation of the drum. Inside the roasting drum are helical baffles which as the drum rotates cause the peppers being roasted to be constantly and repeatedly lifted, agitated and dropped into and through a mass of flame and products of combustion, and also aid in feeding the peppers through the drum. I fill the entire body of the roasting drum with flame and highly heated products of combustion of practically uniform density and temperature, so that as the baffles turn over and drop the pimientoes, they fall through a mass of flame. The result is a very much more exact and uniform roasting than has heretofore been possible, combined with a high speed of operation and a lower percentage of broken or damaged peppers, as well as greater economy in fuel. It should also be noted that one operator can care for a greater number of machines than heretofore on account of their simplicity and automatic features.

My invention is illustrated in the accompanying drawing, in which

Fig. 1 is a longitudinal vertical section showing a single roasting drum, with its driving means, burner, conveyors and smoke drum.

Fig. 2 is a sectional view on the line 2—2 of Fig. 1, showing a common driving means for the apparatus in Fig. 1.

Fig. 3 is a diagrammatic plan view showing the arrangement of the loading and discharging carriers or conveyors and the gates for feeding the material into the respective roasting drums.

Referring to the drawing, and particularly to Figs. 1 and 2, A designates a roasting drum or cylinder supported upon rollers C having flanges to engage complementary bearing flanges B on the roasting drum, whereby the latter is maintained against endwise motion and is entirely supported and may be driven by said rollers C exclusively. These rollers are fixed upon shafts D, one of which carries a drive pulley belted by belt O, to reduction pulleys C' and thence by belt O' to a motor O² or equivalent source of power. The opposite parallel shafts D are cross-belted together by means of belt F for joint driving. H represents piers of concrete or brick or the like carrying the bearings I for the shafts D, and H' are supports which may be angle irons or the equivalent, for the box and rollers within and upon which the conveyor runs which brings the supply of peppers or the like to the roasting drum or drums.

Referring to Figs. 1 and 3 it will be observed that I may organize a battery of roasting drums or cylinders such as described, with a common feed and a common discharge. The feed is effected by means of a carrier belt or chain K with return K'. This belt crosses the ends of the respective drums or cylinders, and may be supported in the usual manner on idler wheels or rollers, the end rollers being drivers and if desired provided with sprocket teeth engaging the carrier or chain to produce a positive feed. The belt K is crossed or partly crossed by gates L—L'—L², projecting from the respective drums or cylinders, and so related to the surface of the carrier belt or chain that they will successively gather and guide into their respective drums desired fractions of the total mass of peppers or other objects. Thus in Fig. 3, we may assume the width of the belt K to be 12 inches and the first gate L may project 4 inches over the surface of the belt, whereby it will gather in one-third of the load carried on the belt. The gate L' may project 8 inches and will gather in the second third, while gate L² projects the entire width of 12 inches and thereby will gather in the remaining third. The division of the load thus distributed is indicated by parallel spaces 1—2—3 in Fig. 3.

Above the carrier K and opposite each drum or cylinder is a smokestack N, and outside of the conveyor K is a box or casing L³, to prevent the load from being displaced off said carrier. It will be understood that in practice the smoke drum of each roasting drum or cylinder may be connected through a suitable breeching to a stack common to all the cylinders, which may be of any known or suitable construction.

The peppers or equivalent food materials, after roasting, are discharged in the continuous rotation and drop off the drum or cylinder A aided by the helical baffles, onto a carrier belt J, which conveys them to the washer. This belt has a guard casing j and is supported on the usual pulleys or rollers, similar to those of the belt K. The end pulleys may have sprocket teeth, especially if the carrier is in the form of a chain, and these end pulleys serving also as driving pulleys may derive their power from the same motor as the parts in Fig. 2. The frame and pulleys of this carrier J are mounted on supports $j'$.

Directly above the carrier belt J and aligned with the axis of the roasting drum or cylinder A, is the burner G which vaporizes or nebulizes oil fuel or emits gas fuel supplied for example through the pipe $g'$ and controlled by the valve $g^2$. The oil or gas is sprayed in a cone $g$ into the open end of the cylinder A, and due in part to its velocity, and in part to the inclination of the cylinder, a constant current of uniform density of flame and heated products of combustion passes upwardly through the length of the cylinder and is discharged into the smokestack.

While I have shown wheels or drums C as flanged and serving both as supports and drivers, it will of course be understood that there are divers other manners of constructing and arranging these parts so as to attain the same end and I do not wish therefore to confine myself to the single species described. The keynote of my present design is simplicity and the secret of its efficiency is in the handling of masses of the material instead of as in the old machines treating it as individual units. My novel means for making mass handling possible is to fill the cylinder or drum with flame and tumble the objects through the flame. These are the essential features, corollary features being that the drum or cylinder A with its helical baffles, must be constantly rotated, preferably in an inclined position, and that the flames or products of combustion must be vented in a suitable manner. The rest is detail, which may be changed at will, without departing from the scope and purview or spirit of my invention.

It is also evident that the roasting drum or cylinder may be made of square, rectangular or other shape with or without separate baffles, without departing from the spirit of my invention.

What I claim is:

1. The method of roasting pimiento peppers which consists in introducing a mass of the peppers into one end of a circumscribed space of considerable length, producing a body of flame in said space, of sufficient heating capacity to singe or roast off the skin upon repeated exposure of the peppers without undue cooking or burning of the meats, and repeatedly subjecting the peppers in mass to the flame and then briefly exposing the peppers to contact with the flame as individual units by repeatedly raising them from the mass and dropping them through the body of flame while causing them to travel continuously from end to end of said space toward the source of said flame.

2. The process of treating pimiento peppers to roast the meat and burn off the skin, which comprises repeatedly subjecting the peppers in mass to a flame and then passing them as individual units through the body of the flame, progressively from a cooler portion of the flame to the hottest portion of the flame, to alternately subject the peppers to a mass cooking or roasting and an individual exposure to flame, at increasing temperatures, to cook the meats and singe or scorch off the skins, the peppers having imparted to them a free rotation in two directions while passing individually through the flame.

JOHN R. SMITH.